United States Patent [19]
Cook et al.

[11] Patent Number: 5,594,649
[45] Date of Patent: Jan. 14, 1997

[54] DIGITALLY RECONFIGURABLE ENGINE KNOCK DETECTING SYSTEM

[75] Inventors: Thomas D. Cook; Manuel R. Fairchild, both of Kokomo; Kenneth D. Mowery, Noblesville; Jeffrey R. Scott, Kokomo, all of Ind.

[73] Assignee: Delco Electronics Corporation, Kokomo, Ind.

[21] Appl. No.: 357,883

[22] Filed: Dec. 19, 1994

[51] Int. Cl.$^6$ .................................. G01L 23/22
[52] U.S. Cl. ................... 364/424.034; 73/35.04; 123/417
[58] Field of Search .............. 364/431.05, 431.08, 364/431.01, 431.04; 123/425, 416, 417; 73/35, 35.03, 35.04

[56] References Cited

U.S. PATENT DOCUMENTS

| | | | |
|---|---|---|---|
| 4,384,473 | 5/1983 | Brandt | 73/35 |
| 4,586,474 | 5/1986 | Akasu | 123/425 |
| 4,664,083 | 5/1987 | Nix et al. | 123/425 |
| 4,675,821 | 6/1987 | Aoki et al. | 364/431.08 |
| 4,700,677 | 10/1987 | Bonitz et al. | 123/425 |
| 4,774,922 | 10/1988 | Morita | 123/425 |
| 4,897,630 | 1/1990 | Nykerk | 340/426 |
| 5,101,790 | 4/1992 | Takasu et al. | 123/425 |
| 5,278,547 | 1/1994 | Suman et al. | 340/825.32 |
| 5,284,047 | 2/1994 | Brokaw | 73/35 |
| 5,343,843 | 9/1994 | Hamren | 123/425 |
| 5,400,644 | 3/1995 | Remboski, Jr. et al. | 73/35 |
| 5,460,031 | 10/1995 | Fujishita et al. | 73/35.03 |

FOREIGN PATENT DOCUMENTS

0309302A2  7/1988  European Pat. Off. .

OTHER PUBLICATIONS

"Signal Processing IC Engine Knock Detector", Harris Semiconductor, Apr. 22, 1992.

*Primary Examiner*—Kevin J. Teska
*Assistant Examiner*—Russell W. Frejd
*Attorney, Agent, or Firm*—Mark A. Navarre

[57] ABSTRACT

An engine knock control system that can be digitally reconfigured to operate in different knock signal processing modes. The system includes a knock detection circuit that processes an incoming knock signal produced by a vibration or pressure sensor on the engine. The circuit includes a plurality of circuit devices that are capable of being interconnected in different circuit topology configurations to thereby process the knock signal in a selected one of a plurality of different modes. The circuit includes hardware and software for forming a selected interconnection configuration of the circuit devices in response to a coded data signal input to the circuit.

13 Claims, 11 Drawing Sheets

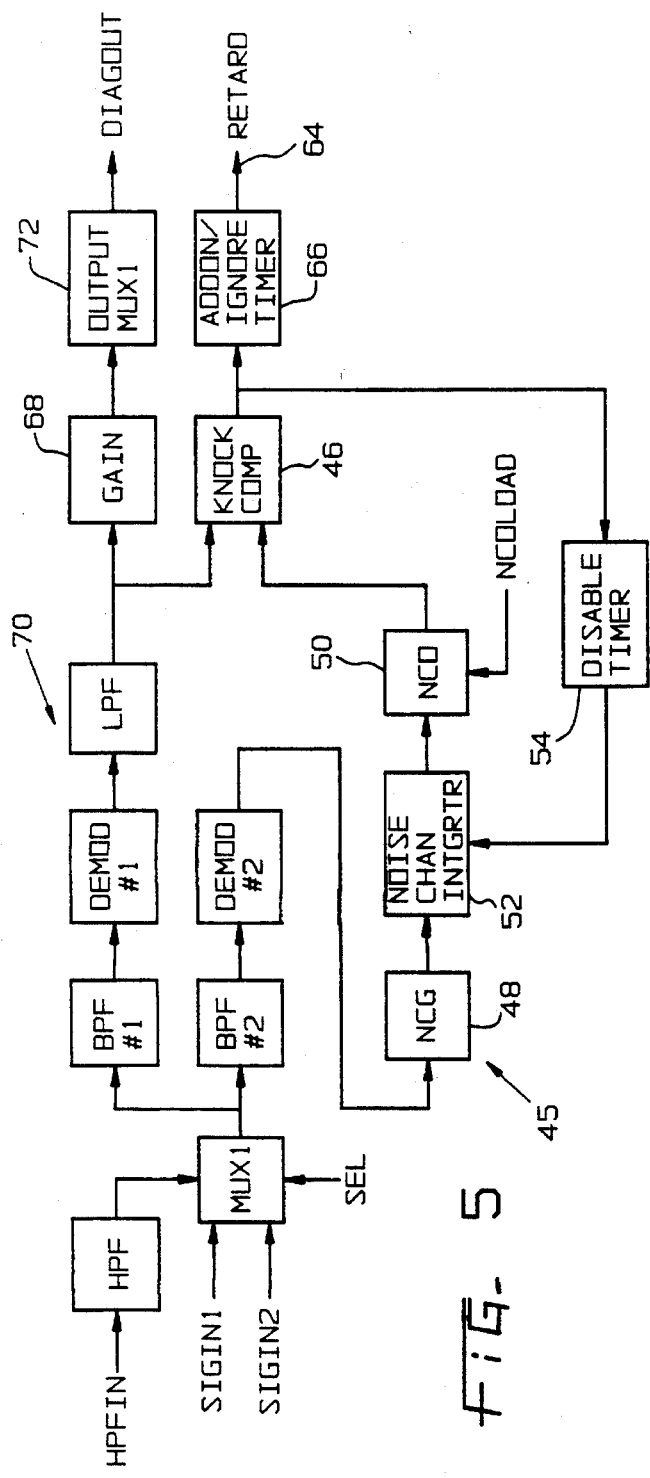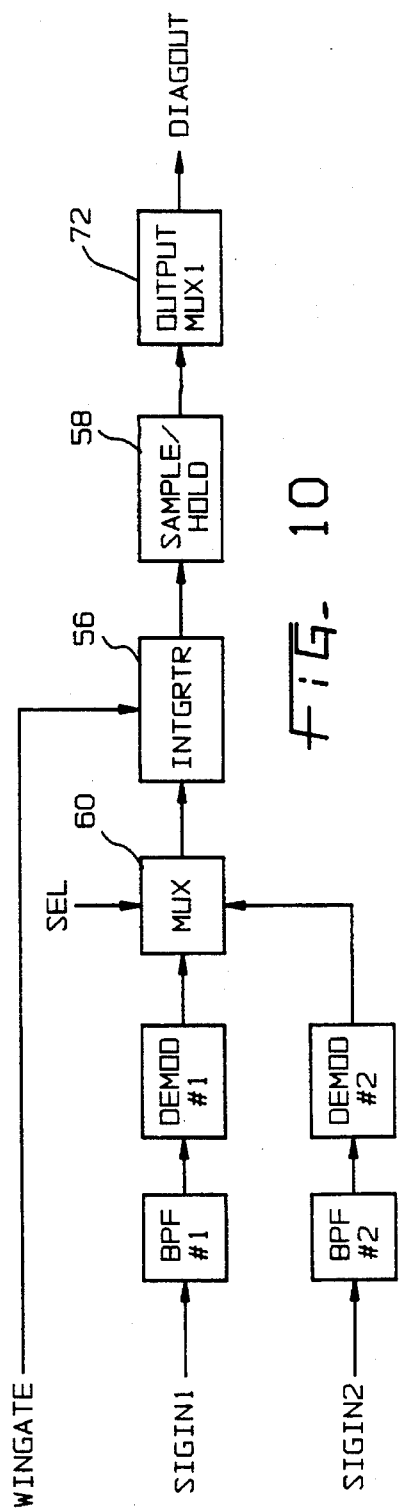

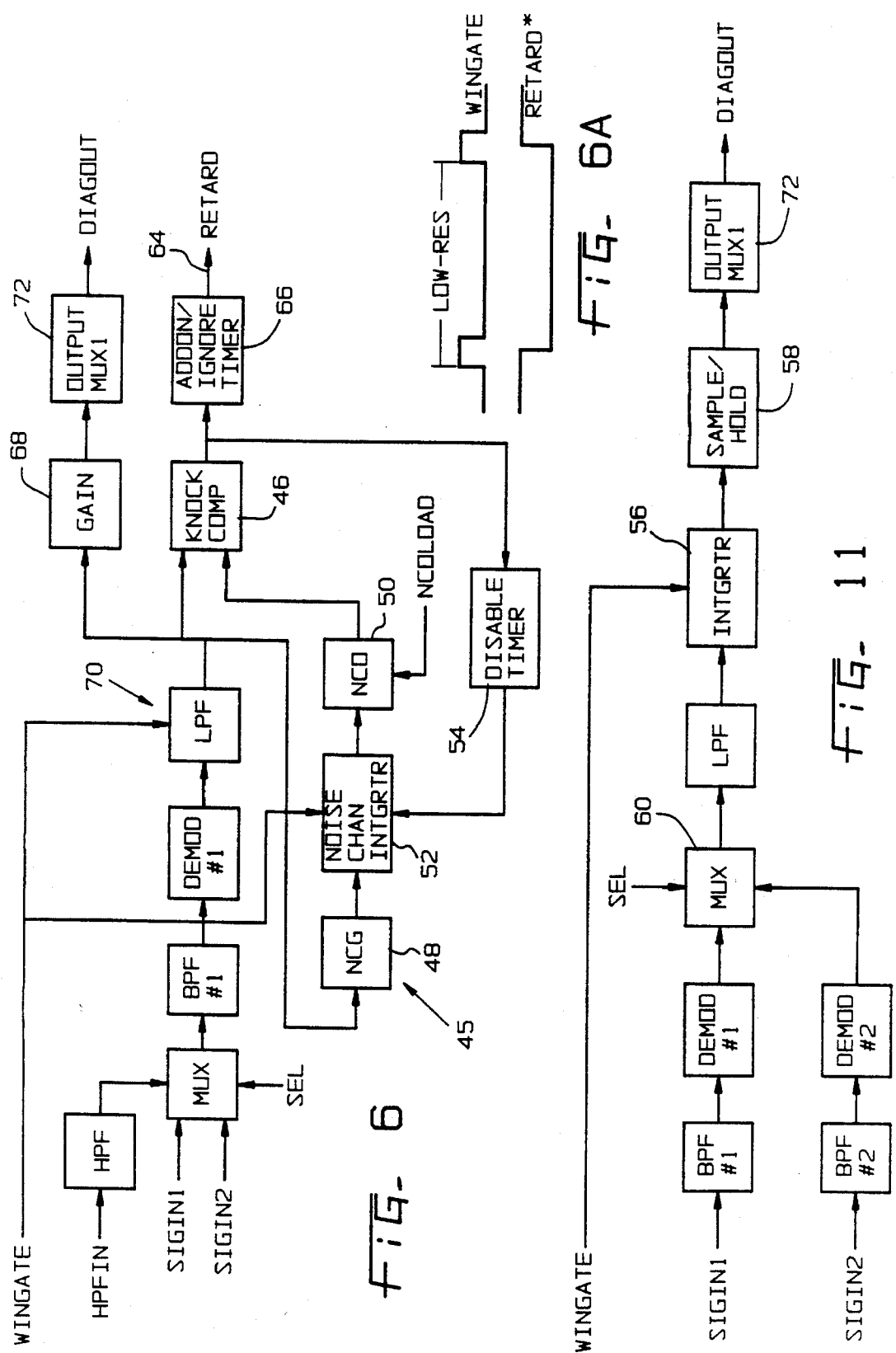

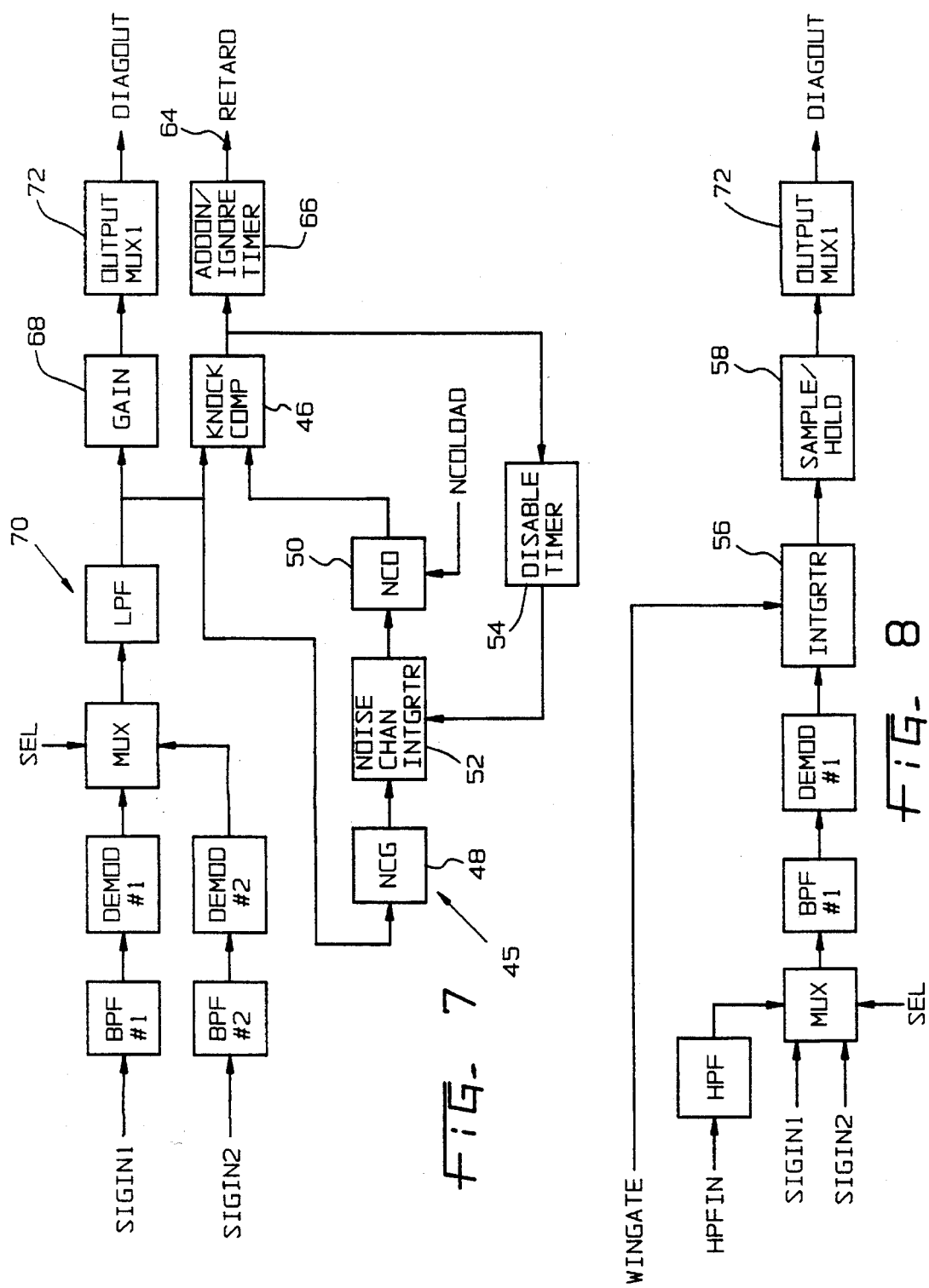

DIGITALLY RECONFIGURABLE ENGINE KNOCK DETECTING SYSTEM

BACKGROUND OF THE INVENTION

This invention relates generally to engine knock control, and more particularly, to an engine knock detecting system that can be digitally reconfigured to operate in different knock signal processing modes.

In recent years, internal combustion engines have been equipped with microprocessor based engine controllers that operate in conjunction with knock control systems to detect engine knock and restrict the knock to acceptable limits by adjusting spark timing or some other engine operating parameter.

A knock detection system is basically a signal conditioner that differentiates between a variety of signals that are detected by acoustic sensors attached to the engine. A problem that must be overcome by a knock detection system is to differentiate between the signals produced by different mechanical stimuli, such as a piston slap or a valve train event as opposed to combustion events that occur because of knocking.

A variety of different signal processing configurations have evolved to provide reliable means for detecting knock in different engine applications. Traditionally, the knock detecting configurations have been separately implemented to match the knock characteristics of different types of engines. This has led to a proliferation of different specific knock detecting systems with limited versatility and applicability. However, these prior art detectors are not capable of being fundamentally reconfigured to utilize one of a plurality of different signal processing modes so that the detector can be applied to a specific engine design in a mode that works best for processing the signal for that particular engine.

Consequently, there exists a need for a knock detecting system that can be digitally reconfigured to operate in different knock signal processing configurations for usage in a wide range of different engine applications.

SUMMARY OF THE INVENTION

The present invention is directed toward providing a digitally reconfigurable knock detecting system that can be programmed to operate in different knock signal processing modes in accordance with configuration signals provided by a microprocessor based engine control unit. By "reconfiguration" what is meant is that the circuit topology, that is the various blocks that comprise the sub-circuits, can be rearranged to process the signal according to the desired mode.

The knock detection system includes a circuit having an input connected to receive an electrical knock signal from at least one sensor mounted on the engine and having an output connected to an engine controller. The circuit includes circuitry for processing the knock signal and generating an appropriate output signal when the output of the knock signal is identified as a valid signal, i.e., caused by true engine knock as opposed to piston slap or other valve or power train noises. The circuit includes a plurality of circuit devices that are capable of being interconnected in a plurality of different circuit topology configurations to thereby process the knock signal in accordance with a selected mode or technique, such as a signal to noise enhancement filter technique (SNEF), or an integrate and read technique. The circuit further includes interconnect means for forming a selected interconnection configuration of the devices in response to a coded data signal input to the circuit.

The coded data signal is preferably a multiple bit digital signal that is entered into a data register. When received by the data register, electronic switches throughout the circuit are set in a unique combination of states to provide the desired reconfiguration of the circuit elements.

The system according to the present invention should be differentiated from prior art systems which are merely reprogrammable, rather than reconfigurable. In reprogrammable knock detection systems, individual circuit elements or devices can be set by software. For example, such reprogrammable parameters would include filter Q, amplifier gain, and the like. In the present invention, on the other hand, the individual circuit elements, which are in essence functional circuit blocks each capable of performing a discrete operation on the knock signal, are rearranged to provide completely different circuit topologies. A particular circuit topology can then be selected to process the knock signal in the desired manner.

An objective of the present invention is to provide improved knock detecting configurations for more reliably detecting engine knock in the noisy engine environment.

Yet another objective of the present invention is provide for the automatic cancellation of offset voltages developed within knock detection circuitry utilized to implement the different knock detecting configurations, thereby compensating for offset errors when detecting engine knock.

These and other aspects and advantages of the invention may be best understood by reference to the following detailed description of a preferred embodiment when considered in conjunction with the accompanying drawings.

DESCRIPTION OF THE DRAWINGS

FIG. 5 is a block diagram of the multiple frequency signal path mode;

FIG. 6 is a block diagram of the windowed SNEF signal path mode;

FIG. 7 is a block diagram of the dual channel SNEF signal path mode;

FIG. 8 is a block diagram of the integrate and read signal path mode;

FIG. 10 is a block diagram of the dual channel integrate and read signal path mode;

FIG. 11 is a block diagram of the dual channel integrate and read (with low pass filter) signal path mode;

DESCRIPTION OF THE PREFERRED EMBODIMENTS

Figure 1:
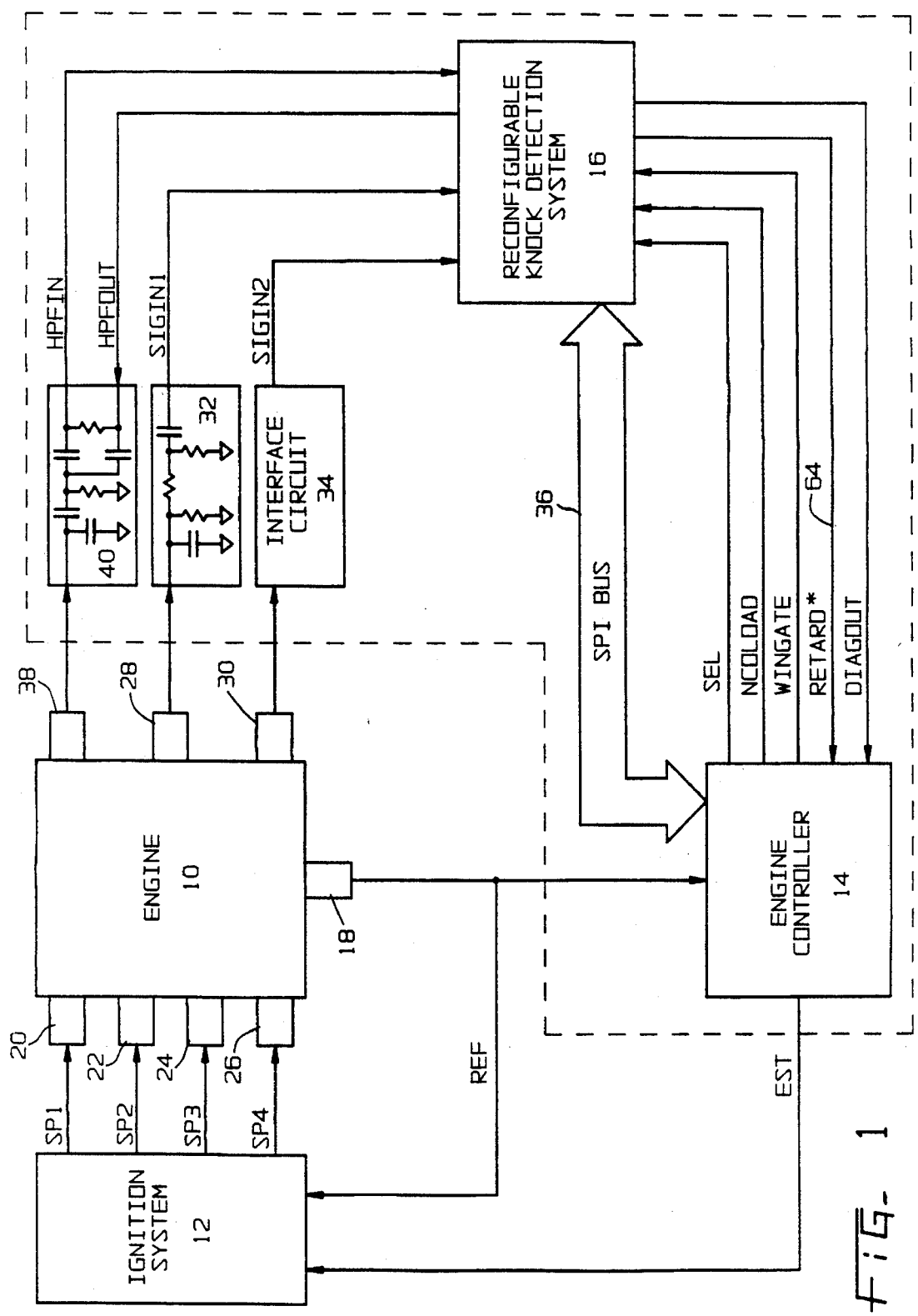
FIG. 1 illustrates a generalized block diagram of an engine including an ignition system, an engine control unit, and a reconfigurable knock detection system that operates in accordance with the principles of the present invention.

Referring now to FIG. 1, there is shown a generalized block diagram illustrating an internal combustion engine 10 having an ignition system 12, a microprocessor based engine controller 14, and a reconfigurable knock detection system 16, also referred to hereinafter as DSNEF.

Engine 10 includes a conventional engine position sensor 18 providing a REF output signal consisting of pulses indicative of the rotational position of the engine 10 in its operating cycle. For the purpose of illustration, engine 10 is shown equipped with spark plugs 20–26 for firing each of four engine cylinders during the operating cycle, but engine 10 could also have a different number of cylinders since the applicability of the present invention is not limited to engine having only four cylinders.

The ignition system 12 includes conventional ignition power circuitry and ignition coils for developing ignition pulse signals SP1–SP4 for firing each of the respective engine spark plugs 20–26 based upon the REF inputs signal provided by engine position sensor 18 and an electronic spark timing signal EST provided by the engine controller 14.

The engine controller 14 is a conventional digital computer used by those skilled in the art of engine control and typically includes a standard microprocessor, random access memory, read only memory, non-volatile memory, analog-to-digital and digital-to-analog converters, input/output circuitry, and clock circuitry.

During normal engine operation, engine controller 14 operates to produce the appropriate EST spark timing signal provided to the ignition system 12 based upon the input REF signal, and inputs derived from other engine sensors that have not been specifically shown, such as engine load and coolant temperature sensors. Such operation is well known in the art, and for brevity, further details will not be discussed in the present specification.

It is also commonly the practice to provide engine 10 with some form of knock sensing and detection circuitry so that the engine controller 14 can restrict the knock to acceptable limits by adjusting the EST spark timing or some other engine operating parameter.

Over the years, a variety of different signal processing configurations have evolved to reliably detect the occurrence of knock in different engine applications. Traditionally, the different knock detecting configurations have been separately implemented on different types of engines to suit their respective knock characteristics. This has led to a proliferation of different types of knock detecting systems, each having limited versatility and applicability.

The present invention is directed toward providing a knock detection system 16 that can be digitally altered to operate in various knock signal processing configurations suitable for use in a wide range of different engine applications.

As generally illustrated in FIG. 1, the reconfigurable knock detection system 16 preferably receives inputs signals SIGIN1 and SIGIN2 derived from conventional acoustic knock sensors 28 and 30 mounted on engine 10. The knock sensors 28 and 30 measure vibrational accelerations of respective groups of engine cylinders due to knocking and generate corresponding knock output signals. The knock output signal produced by each knock sensor 28 or 30 passes through a corresponding interface circuit 32 or 34 prior to entering the reconfigurable knock detection system 16. As indicated, the interface circuits 32 and 34 comprise identical resistor-capacitor filtering networks for removing RF noise and blocking any DC component present in the knock signals produced by the knock sensors 28 and 30.

The output signals produced by the reconfigurable knock detection system are designated as RETARD* and DIAGOUT, and are directed to the engine controller 14. As will be described more completely at a later point in the specification, RETARD* is a digital signal indicating the presence of an engine knock burst in one of the knock input signals SIGIN1 or SIGIN2 for a portion of the possible configurations of the knock detection system, while DIAGOUT is an analog signal serving the same function for the remaining configurations of the knock detection system.

The knock detection system 16 is switched between its different knock signal processing configurations based upon programming signals provided by the microprocessor based engine controller 14 over the serial peripheral interface (SPI) bus 36. The remaining signals SEL, NCOLOAD, and WINDGATE are used to control various operations that are performed within the knock detection system in the different signal processing configurations. Element 38 is a pressure sensor that detects the cylinder pressure and provides an output signal HPFIN to knock detection system 16.

Figure 2A:
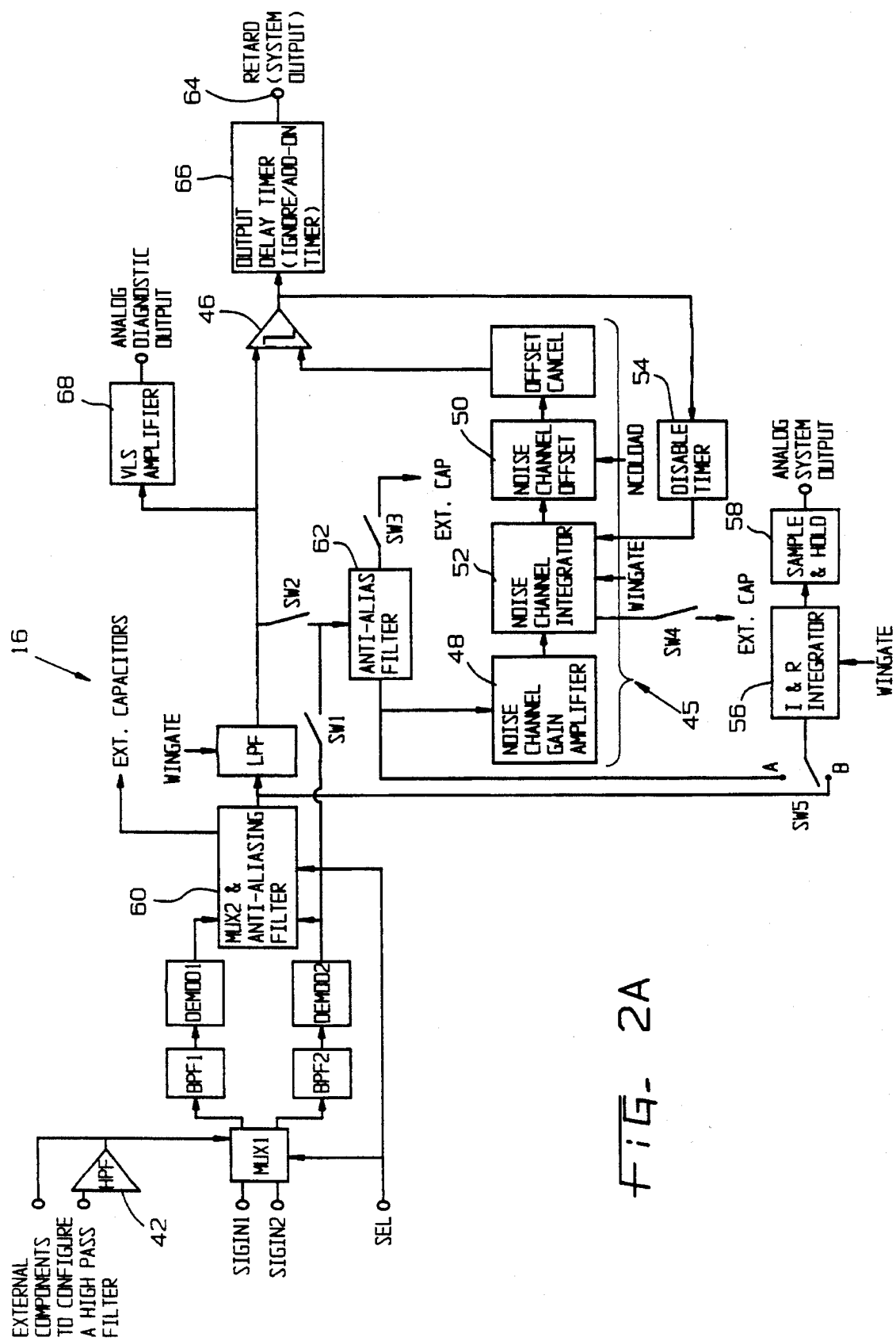
FIGS. 2A and 2B together form a block diagram of the reconfigurable knock detection system in accordance with the present invention.
Figure 2B:
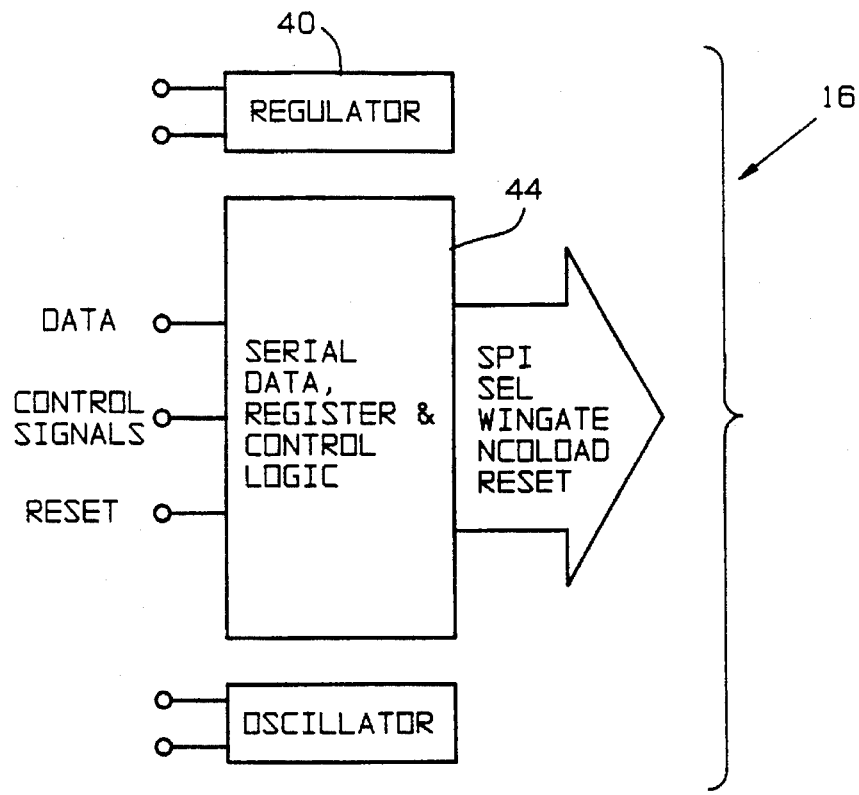

Referring now to FIGS. 2A and 2B, there is shown a general block diagram of the components included within the reconfigurable knock detection system 16 that operates in accordance with the principles of the present invention. The knock detection system 16 shown in FIGS. 2A and 2B comprises a plurality of discrete circuit devices (functional circuit blocks) that can be interconnected in a plurality of different configurations by means of the settings of switches SW1–SW5. Furthermore, individual circuit devices can be set to route or process the incoming signals in the manner appropriate for the mode that is selected. The vibration signal inputs are received on inputs SIGIN1 and SIGIN2, and the pressure input from sensor 38 is received on the input of the high pass filter HPF.

Figure 3:
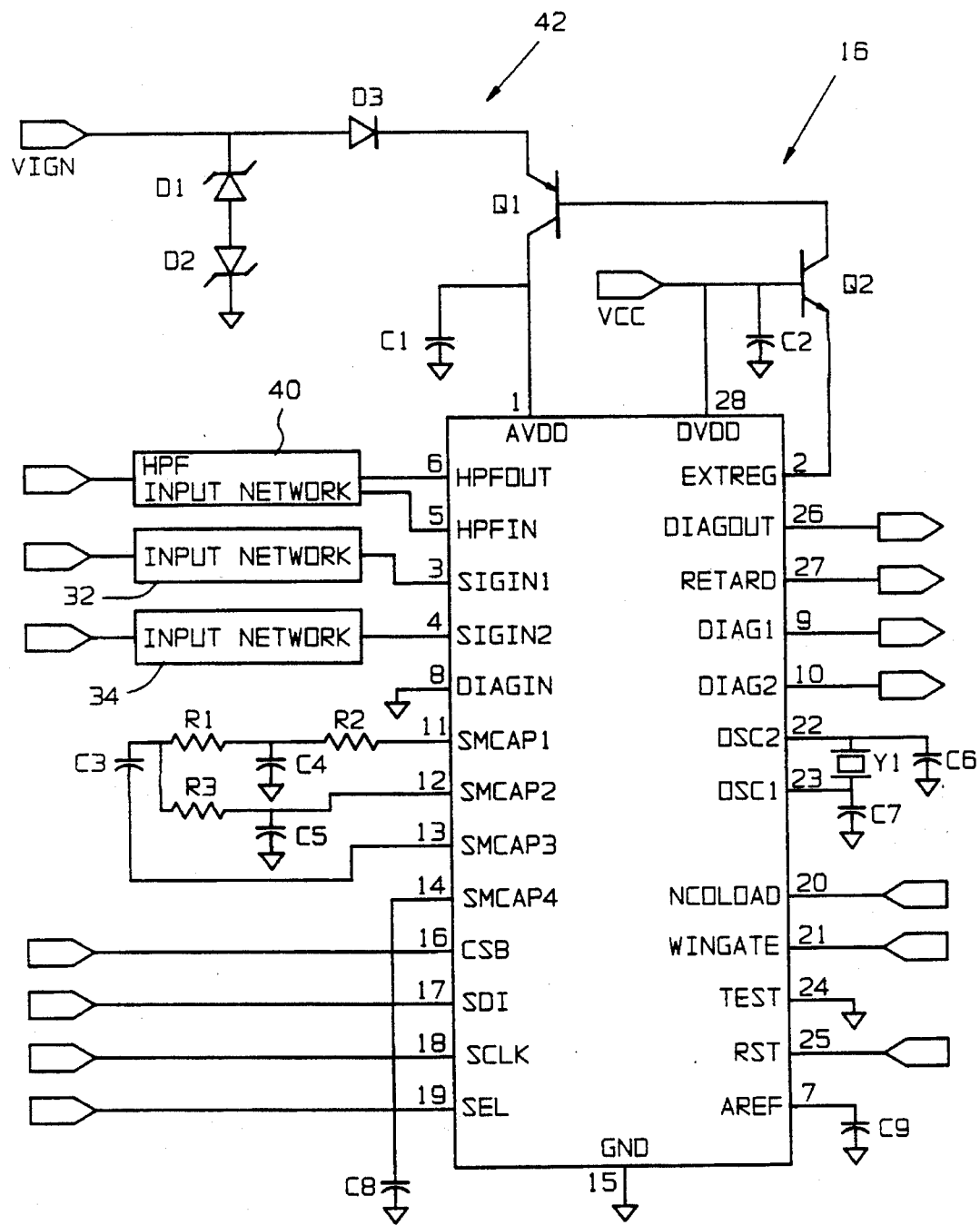
FIG. 3 is a schematic diagram illustrating the pin descriptions for the knock detection system IC.

FIG. 2B illustrates the serial data register and control logic block 44. In this block is a serial data register that receives a serial data stream setting the various switches S1–S5 and setting individual circuit devices in a manner which will be described in detail hereinafter. FIG. 3 is an illustration of the pin assignments for the knock detection circuit, which is in the form of an integrated circuit chip.

Prior to describing the various interconnection configurations that are possible to achieve the various desired modes of signal processing, the nature and operation of the individual circuit devices will be described.

General Description

With reference to FIGS. 2A and 2B, knock detection system 16 is a monolithic silicon circuit that functions as an interface and signal conditioner between a knock sensor 28, 30 and an engine controller 14. This device is designed to operate with a 4.9 V to 5.1 V DVDD supply and a 7.6 V to 8.4 V AVDD supply. This device is capable of operating over the case temperature range of –40° C. to +125° C. A serial peripheral interface (SPI) bus 36 is provided to dynamically program the IC to meet the requirements of specific engine calibrations. Shaping, background comparison, and amplification allow this device 16 to detect the sensor outputs unique to engine spark knock. Knock detector 16 has both a digital output pulse and an analog signal that may be used by microcontroller 14 in an intensity based knock control system.

the state of the SEL pin and the state of the HYPBYP bit, MUX1 directs the input signals to BPG1 and BPG2 stages as shown in the following table. MUX1 also has the capability to "add" the two input signals SIGIN1 and SIGIN2 together via a wire OR configuration in multiplexer MUX1. This function is selectable through the MUXOR bit in the serial input register.

| Mode Bits | Sel Pin Logic State | Muxor Bit Logic State | HPFBYP Bit Logic State | Input to BPF1 | Input to BPF1 |
|---|---|---|---|---|---|
| 000 | 0 | 0 | 0 | SIGIN1 | 0.5 × AVDD* |
| 000 | 1 | 0 | 0 | SIGIN2 | 0.5 × AVDD |
| 001 | 0 | 0 | 0 | SIGIN1 | SIGIN1 |
| 001 | 1 | 0 | 0 | SIGIN2 | SIGIN2 |
| 010 | 0 | 0 | 0 | SIGIN1 | 0.5 × AVDD |
| 010 | 1 | 0 | 0 | SIGIN2 | 0.5 × AVDD |
| 011 | X | X | X | SIGIN1 | SIGIN2 |
| 100 | X | X | X | SIGIN1 | SIGIN2 |
| 101 | X | X | X | SIGIN1 | SIGIN2 |
| 110 | 0 | 0 | 0 | SIGIN1 | 0.5 × AVDD |
| 110 | 1 | 0 | 0 | SIGIN2 | 0.5 × AVDD |
| 111 | 0 | 0 | 0 | SIGIN1 | 0.5 × AVDD |
| 111 | 1 | 0 | 0 | SIGIN2 | 0.5 × AVDD |
| 000 | X | X | 1 | HPFOUT | 0.5 × AVDD |
| 001 | X | X | 1 | HPFOUT | HPFOUT |
| 010 | X | X | 1 | HPFOUT | 0.5 × AVDD |
| 110 | X | X | 1 | HPFOUT | 0.5 × AVDD |
| 111 | X | X | 1 | HPFOUT | 0.5 × AVDD |
| 000 | X | 1 | 0 | SIGIN1 + SIGIN2 | 0.5 × AVDD |
| 001 | X | 1 | 0 | SIGIN1 + SIGIN2 | SIGIN1 + SIGIN2 |
| 010 | X | 1 | 0 | SIGIN1 + SIGIN2 | 0.5 × AVDD |
| 110 | X | 1 | 0 | SIGIN1 + SIGIN2 | 0.5 × AVDD |
| 111 | X | 1 | 0 | SIGIN1 + SIGIN2 | 0.5 × AVDD |

*AVDD is the supply voltage
X: state is irrelevant

Voltage Regulator

Voltage regulator 40 (FIG. 2B) regulates the voltage on the AVDD pin by controlling the current in an external transistor via the EXTREG pin. The external transistor is regulated to supply +8 V +/−5% from the ignition supply voltage (approx. 10 V to 26 V). During power-up conditions, the ignition supply voltage to the regulating transistor will be present for up to 1 μs before the +5 V DVDD supply voltage. The regulator must insure that the AVDD supply voltage does not go above +8.8 V during the power-up conditions or during certain voltage transients as specified below.

High Pass Filter Op-amp

Amplifier 42 is provided so that the user of this device may configure this amplifier as a high pass filter with the addition of external passive components.

High pass filter 42 is intended to be configured as follows: it will have a gain of 4.545 V/V, a 3 dB cutoff frequency of 3999 Hz, and a Q factor ≦1 (to insure that no "peaking" occurs in the pass band). The purpose of this filter is to eliminate the low frequency pressure waveform that occurs when using cylinder pressure sensors to determine the presence of engine knock.

Filter 42 may be bypassed by setting the HPFBYP bit to a "0" in the serial input register in logic block 44. When the bypass mode is selected, MUX1 only allows signals from SIGIN1 and SIGIN2 to continue through the DSNEF signal path.

Multiplexers MUX1 and MUX2

Multiplexer MUX1 has as inputs the following: input signals from SIGIN1, SIGIN2 and HPFIN (after passing through the HPF op-amp 42). Based on the mode selected, The SEL pin is sampled on an internal clock edge to maintain its clock alignment with filters BPF1 and BPF2; this will minimize disturbance to the filters caused by switching input signals. The maximum switching frequency on the SEL pin will be 750 Hz.

MUX2 routes either the DEMOD #1 or DEMOD #2 output to both the LPF and the I&R integrator. The output of MUX2 is determined by the mode selected and the state of the SEL pin. The following is the truth table for MUX2.

| MODE bits | SEL pin Logic State | Channel Path Selected |
|---|---|---|
| 000 | X | DEMOD #1 to LPF |
| 001 | X | DEMOD #1 to LPF |
|  |  | DEMOD #2 to NCG |
| 010 | X | DEMOD #1 to LPF |
| 011 | 0 | DEMOD #1 to LPF |
| 011 | 1 | DEMOD #2 to LPF |
| 100 | 0 | DEMOD #1 to LPF |
| 100 | 1 | DEMOD #2 to LPF |
| 101 | 0 | DEMOD #1 to I&R Integrator |
| 101 | 1 | DEMOD #2 to K&R Integrator |
| 110 | X | DEMOD #1 to I&R Integrator |
| 111 | X | DEMOD #1 to LPF |

X: state is irrelevant

Bandpass Filter #1

Some of the characteristics of Bandpass Filter #1 are programmable. The center frequency (fc) is programmable from 5 KHz to 22 KHz. The Q of the filter is selectable between 1.5 and 10.5. The gain of the filter (Av) is programmable from 0 to +26.8 dB when using a suitable RC input network. The equivalent external resistance adds to the input resistance to an internal op-amp that is configured as an inverting amplifier with a programmable feedback resistor that sets the BPF gain. If another resistance is used, the gain range will change. The wide gain range allows for the use of pressure sensors, flat response vibration sensors, and resonant vibration sensors. DC coupling is used between BPF1 and the demodulator stage.

Programming of BPF1 is accomplished by setting the FILTSEL bit in the serial input register to a "0" and writing the appropriate bits to set the gain, center frequency and Q.

Bandpass Filter #2

The characteristics of Bandpass Filter #2 are the same as those of BPF1. Programming of BPF2 is accomplished by set the FILTSEL bit to a "1" and writing data to the same bits in the serial input register as are written when programming BPF1.

BPF2 is only used in the signal path when the mode bits (MODE2-0) are set to "001", "011", "100", or "101". In each of these modes BPF1 and BPF2 may be set-up independently.

Demodulator #1

Demodulator DEMOD1 performs a half wave rectification on the signal that is output from bandpass filter BPF1.

Demodulator #2

Demodulator DEMOD2 performs a half wave rectification on the signal that is output from BPF2.

Lowpass Filter

Filter LPF is connected to the output of MUX2. This filter has a programmable cutoff frequency (LPCF) of 121 Hz to 938 Hz. The Q of the filter (Q) is between 0.25 and 1. This filter detects the envelope of the incoming knock burst.

Noise Channel and Knock Comparator

The noise channel 45 amplifies, continually averages, and adds a DC offset voltage to the output of LPF. This allows the noise channel 45 to establish a threshold which must be exceeded by the magnitude of the knock signal (output of LPF). If the knock signal exceeds the threshold of noise, then the output of the knock comparator 46 is enabled. The threshold established by the noise channel 45 allows the system's sensitivity to knock to be constantly adjusted. The noise channel gain amplifier 48 (NCG) is programmable from 1.3 to 2.8 V/V in steps of 0.1 V/V. The noise channel offset 50 (NCO) can be programmed from 0 mV to 248 mV in steps of 8 mV. Under no circumstances will the offset ever be negative.

The NCO setting has the capability to be implemented in one of two ways. First, the NCO 50 may be programmed into the SPI with the NCOLOAD bit as "1". This method would update the NCO data bits; however, the NCO 50 will not take effect in the noise channel 45 until the NCOLOAD pin is transitioned from a logic "0" to a logic "1" (rising edge). When the rising edge occurs, the last value programmed into the NCO bits takes effect. This method allows the microcontroller to program the new setting at its convenience. In the actual application the NCOLOAD pin (FIG. 3) would then be connected to a signal that was related to engine position. This allows the NCO 50 to be updated during a predetermined portion of an engine cycle.

The second method of implementing the NCO bits involves programming the NCOLOAD bit to "0". This will indicate that the NCO update is to take effect immediately following the SPI transmission. This method is used when engine position synchronous updating is not necessary. Any transitions on the NCOLOAD pin are ignored during this mode of operation.

Figure 2C:
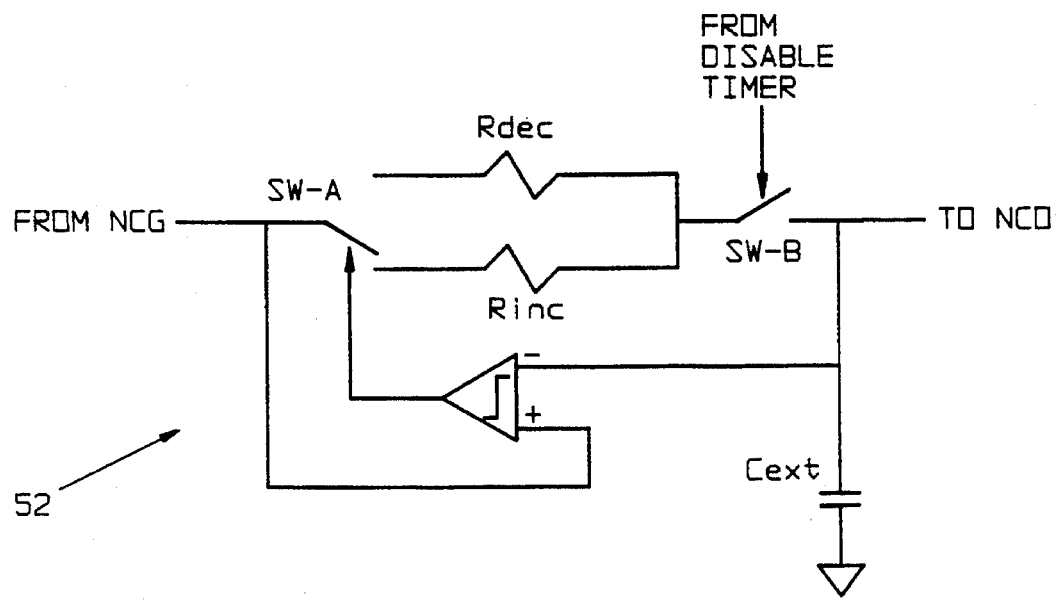
FIG. 2C is a circuit schematic of the noise channel integrator illustrated in FIG. 2A.

The noise channel integrator 52 is composed of the circuitry shown in FIG. 2C.

Switch SW-A is shown commanded into the "hold" position when the knock comparator 46 enables (LPF output >NCO output), signaling that knock is present. When knock comparator 46 disables or the disable timer 54 times out, the switch is released and the integrator 52 is allowed to integrate the changing noise channel voltage. The decision whether to use the increasing or decreasing time constant is determined by comparing the voltage from the NCG stage to the voltage from the noise channel integrator. If the NCG voltage is greater, then the increasing time constant ($R_{inc}$) is used. If the NCG voltage is smaller, then the decreasing time constant ($R_{dec}$) is used. The different time constants allow the noise channel 45 to be more sensitive to increasing voltage levels, but less sensitive to decreasing voltage levels. The "hold" position serves to "disable" the noise channel from integrating the knock signal. This prevents the noise channel voltage from increasing for the duration of the knock pulse or the time set in the disable timer 54, whichever is shorter.

The two time constants of the integrator are programmable. The increasing time constant is programmable from 62 ms to 137 ms in steps of 25 ms. The decreasing time constant is programmable from 210 ms to 330 ms in steps of 40 ms.

Disable Timer

The output of the knock comparator 46 controls disable timer 54. The purpose of this timer is to set the maximum time that the noise channel 45 will be disabled by a knock burst. When a suspected knock burst is initially detected, knock comparator 46 is enabled and noise channel integrator 52 is "disabled". At the same time, disable timer 54 is started. When disable timer 54 reaches a predetermined count, it re-enables the noise channel 45. This eventually causes knock comparator 46 to turn off because noise channel integrator 52 will integrate the "knock" pulse, thus raising the comparison threshold. If knock comparator 46 turns off prior to the predetermined count of disable timer 54, noise channel integrator 52 will be re-enabled. Disable timer 54 is programmable from 2.5 ms to 30 ms.

I & R Integrator and Sample/Hold

The I&R (integrate and read) integrator 56 and sample/hold 58 are used when the device is commanded into one of the four Integrate and Read modes. When in these modes, I&R integrator is enabled/disabled by the state of the WINGATE pin (FIG. 3). On the rising edge of WINGATE, integrator 56 is allowed to integrate the output of the previous stage. The actual integration starts within 128 μs the rising edge of WINGATE. On the falling edge of WINGATE, the output of integrator 56 is transferred to the sample/hold 58 and integrator 56 is reset to the reference voltage. The transfer to sample/hold 58 may take up to 16 μs before the output voltage settles. Sample/hold 58 allows integrator signal to be held until the next falling edge of WINGATE, one reference period.

The integration time is programmable via the serial input register bits NCO4-0 and the integration rate is selectable between 25 μs and 800 μs.

| WINGATE Logic State | Output State of I&R Integrator 56 |
|---|---|
| "0" | Not integrating |
| "1" | Integrating |

Anti-Aliasing Filters

Two anti-aliasing filters are incorporated into the device through the use of internal and external components to reduce aliasing of the waveforms being processed. Filter 60 is a 3-pole filter, and filter 62 a 1-pole filter. Filter 60 is implemented on pins SMCAP1, SMCAP2, and SMCAP3. Filter 62 is implemented with the pin SMCAP4.

Filter 60 is located between the output of the DEMOD#1 and DEMOD#2 stages and the input to the LPF stage. Filter 62 is located between output of the DEMOD#2 and LPF stages and the input to the noise channel gain 48 and the I&R integrator stage.

Output multiplexer MUX1 outputs one of the following stages onto DIAG1 pin depending upon the bits set in the serial input register:

BPF2 Gain

BPF1

LPF

VLS Gain

I&R Sample/Hold

Demodulator #2

Noise Channel Integrator

A further output multiplexer (not shown) outputs one of the following stages onto the DIAG2 pin depending upon the bits set in the serial input register:

BPF1 Gain

Demodulator #1

NCG

NCO

I&R Integrator

BPF2

Offset Cancel (Knock Comparator Input)

One of the purposes for arranging the stages as they are shown is to allow for both noise channel offset and LPF to be output at the same time. This along with the RETARD* output provides an excellent means for testing the operation of the device.

Offset Cancelling (SNEF Modes)

Figure 12:
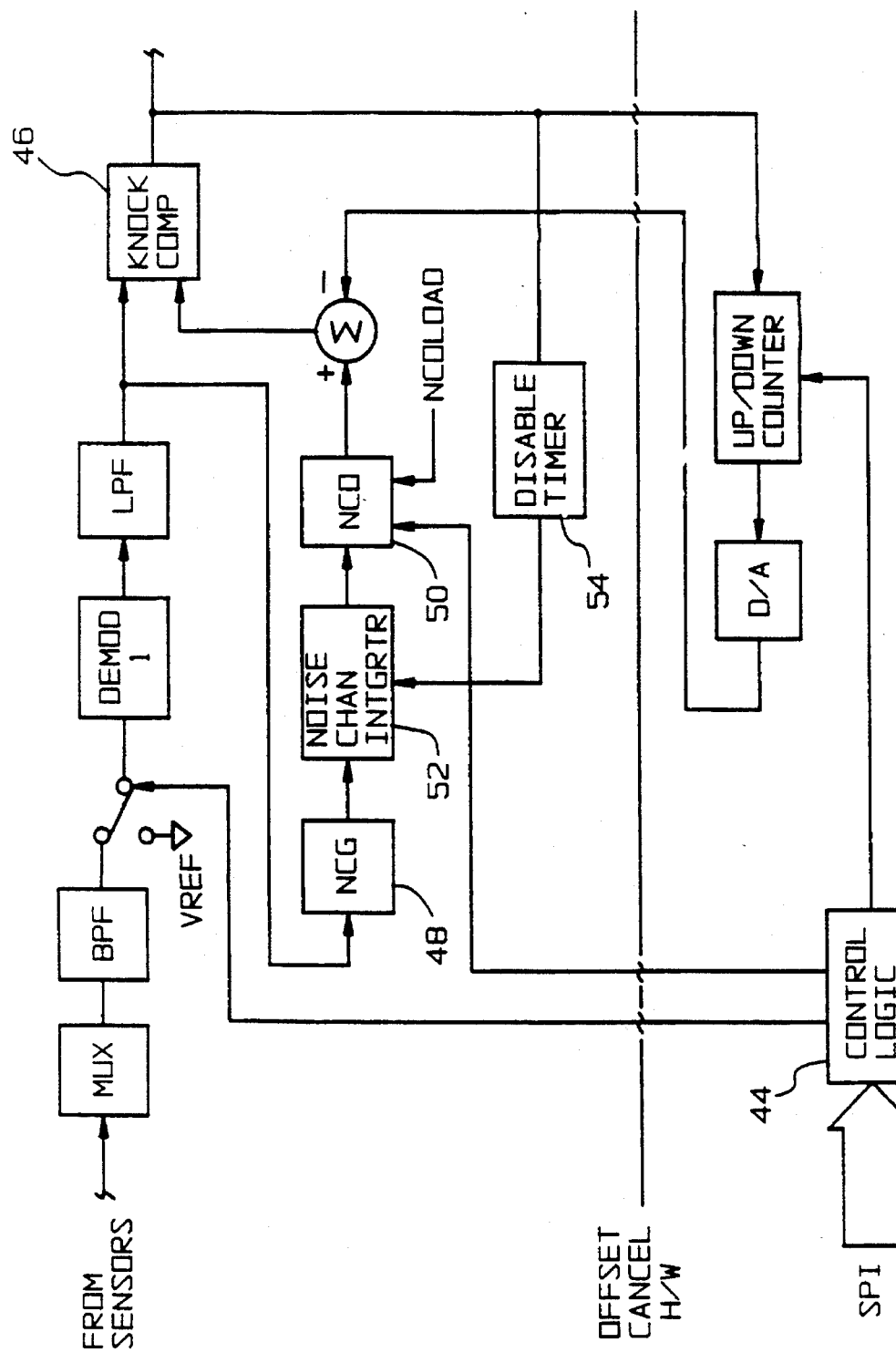
FIG. 12 is a block diagram of the circuit configuration for offset cancelling the SNEF modes.

In the SNEF modes, a method of cancelling the offset voltage between the DEMOD1 input and the output of the NCO block 50 is implemented as follow. With reference to FIG. 12, when compensating for the offset voltage inherent in the circuit blocks, this stage compares the signal level out of the LPF stage to signal level out of the noise channel offset stage 50, with zero NCO offset commanded, and correct for the amount of offset between the circuit paths. This is done by decreasing the time constant of the LPF (to allow faster settling), setting the noise channel integrator 52 to a zero time constant (by disconnecting the external capacitor on SW4 (FIG. 2A), and slightly adjusting the noise channel offset until the noise channel signal offset level matches that of the LPF stage. During offset cancellation, the output state of the RETARD* pin is held in the state that was present before offset cancellation began.

Figure 13:
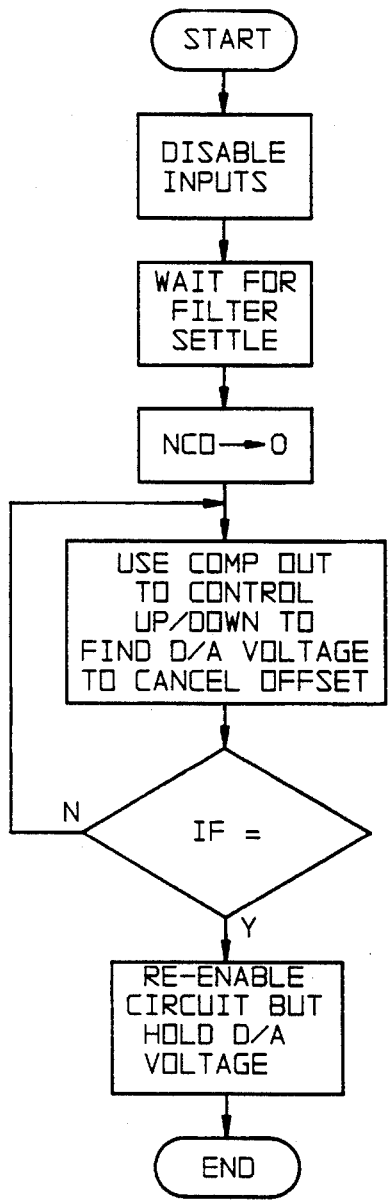
FIG. 13 is a flow chart for the operation of the circuit of FIG. 12.

Offset cancellation is controlled via the OFFCNCL bit in the Serial Input Register. In the SNEF modes ("000", "001", "010" and "011"), when the OFFCNCL bit is set to a "1", the device performs the offset cancelling function on the rising edge of chip select (cs*). The offset cancellation function will be completed within 10 ms. Should a falling edge occur in the middle of an offset cancel, the offset cancel will be stopped and the previous value for the offset cancel reinstated. FIG. 13 illustrates the software routine for implementing offset.

Due to low frequency content of the signals processed in all of the different modes of operation of the DSNEF design, it is desirable to DC couple all of the stages in the circuit. This is also true of the previous SNEF and older MFB knock detector designs. The new challenge of DSNEF is due to it's ability to be reconfigure into many different block arrangements. Also, an additional parasitic of the switched capacitor design is a somewhat larger DC offset than could be offered on a non-programmable equivalent. All modes of operation of the DSNEF design will be very sensitive to additive effects of the DC offset across all of the blocks of the circuit.

The mechanization of the DC offset cancellation circuit has allowed for a technique to cancel all combined parasitic offsets. This circuit will be activated by the PCM software during times of known inactivity of engine knock. The software activation will start a hardware controlled sequence which will disconnect the signal inputs from the vibration sensors, allow for filter settling time and calculate a compensation offset which when added to the parasitic offset will result in a very close to zero composite. This process will be accomplished during power-on initialization and anytime the operation mode is changed. A periodic re-zero during normal operation may also be used to eliminate drift effects.

The addition of this technique will not only allow the reconfiguration of the circuit blocks while maintaining control of the total DC offset, but also, allow for much tighter control of the system calibration accuracy than was available on the older designs.

Offset Cancelling (I & R Modes).

Figure 15:
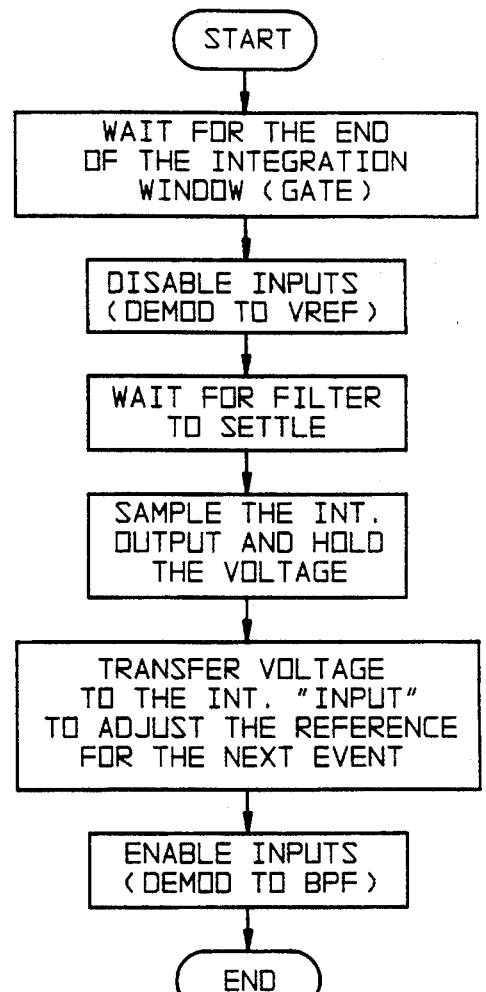
FIG. 15 is a flow chart showing the operation of the circuit of FIG. 14.
Figure 14:
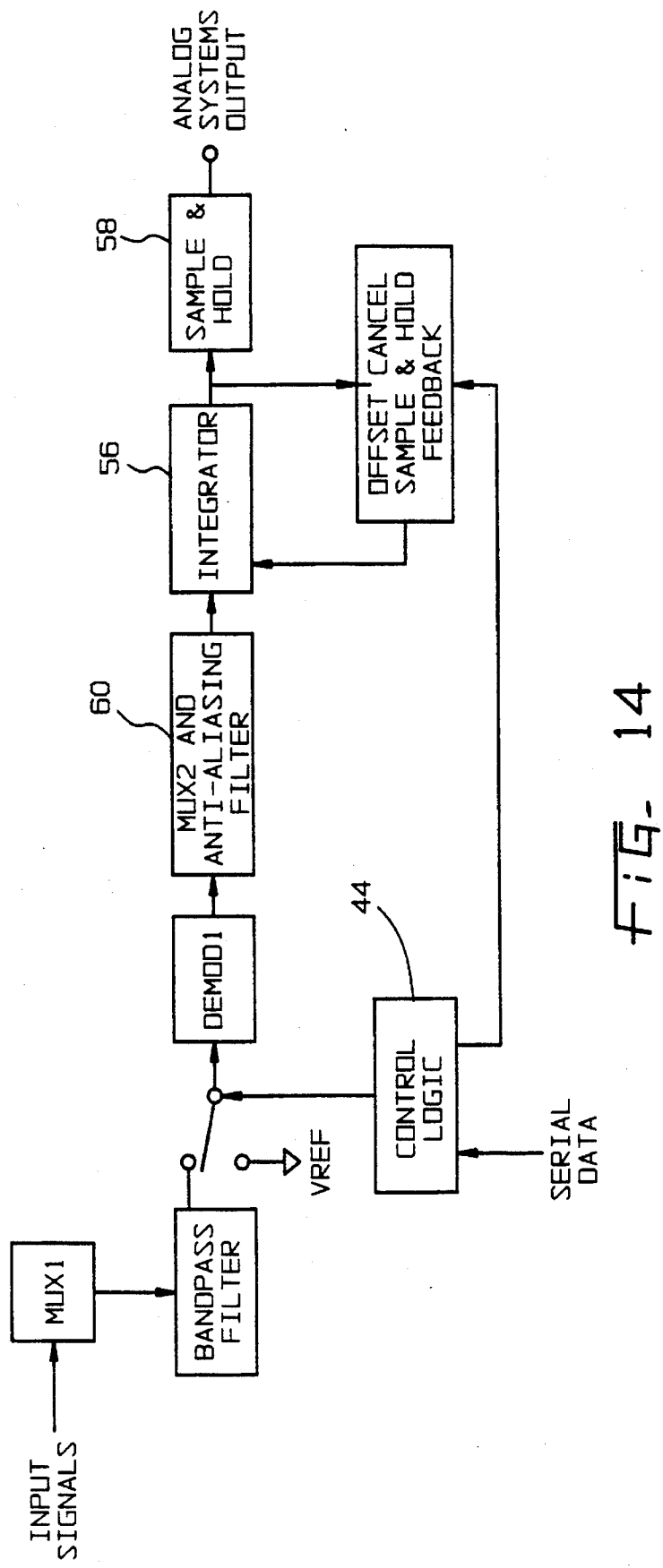
FIG. 14 is a block diagram of the circuit configuration for offset cancelling in the integrate and read modes.

With reference to FIGS. 14 and 15, when in the integrate and read modes, the offset cancel function is performed by allowing the integrator 56 to integrate without a signal present by forcing the input to both of the demodulators to be +4 V (no signal output level of BPF). This is performed after the final integrator value has been transferred to the S/H 58 and integrator 56 is reset. Any offset voltages above $V_{REF}$ will show up as a small movement in integrator 56. This offset value is then used to correct the integrator on the next cycle. Each of the two demodulator signal paths are cancelled by switching from one DEMOD to the other on consecutive offset cancellation cycles. The switching between DEMODs occurs regardless of the state of the MUXSEL pin. The offset error voltage for each DEMOD signal is stored in a manner such that the combination of the MUXSEL pin and the MODE bits command a certain path causing the offset voltage for that path to be incorporated into I&R integrator 56 in order to cancel the error voltage. Switching between the DEMODs insures that the offset correction value for each signal path is always maintained.

In modes "100", "101", "100" and "111, when OFFCNCL is set to a "1", the device performs an offset cancel after each falling edge of WINGATE.

Ignore/Add-on Timer

Timer 66 ensures that pulses out of knock comparator 46 with a width less than 784 μs +/−25 μs are ignored (filtered out). If a pulse passes through the ignore timer 66, the add-on timer shall adds 784 μs +/−25 μs to the pulse. The purpose of this timer is to filter out extraneous switching noise that may occur on knock comparator 46 and to guarantee a minimum pulse width on the RETARD* output pin 64.

Vibration Level Signal (VLS) Amplifier

Amplifier 68 amplifies the signal output from the Low Pass Filter stage. The gain is programmable via the Serial Input Register bits VLSG3-0. The values that are to be programmed are 1.3 V/V to 12.3 V/V in steps of 1 V/V. The output of VLS amplifier 68 is connected to the output MUX 72.

Mode Selection

FIGS. 4–11 illustrate eight possible reconfiguration schemes to process the knock signal in one of eight modes. These are only illustrated in nature, and the present invention is not limited to any particular number of modes nor is it limited to the particular modes described hereinafter. The individual circuit devices, which are in essence functional blocks capable of performing certain operations on the knock signal, are interconnected in different circuit topologies by means of the settings of switches SW1–SW5 in accordance with the following table:

| DSNEF COMPOSITE BLOCK DIAGRAM SWITCH MATRIX | | | | | |
| --- | --- | --- | --- | --- | --- |
| Mode Selection | SW1 | SW2 | SW3 | SW4 | SW5 |
| Mode 0 (000) | OPEN | CLOSED | OPEN | CLOSED | * |
| Mode 1 (001) | CLOSED | OPEN | OPEN | CLOSED | * |
| Mode 2 (010) | OPEN | CLOSED | OPEN | CLOSED | * |
| Mode 3 (011) | OPEN | CLOSED | OPEN | CLOSED | * |
| Mode 4 (100) | OPEN | CLOSED | CLOSED | OPEN | A |
| Mode 5 (101) | OPEN | OPEN | * | * | B |
| Mode 6 (110) | OPEN | OPEN | * | * | B |
| Mode 7 (111) | OPEN | CLOSED | CLOSED | OPEN | A |

*State is irrelevant

Functional Description

As indicated above, knock detection system 16 is a monolithic silicon circuit that functions as the signal conditioner of a knock detector within a microcontroller. The signal conditioning can be configured into one of eight modes of operation to best suit the specific engine application. The input signal can be in the form of up to two vibration based sensors or a single pressure based signal. Mode selection, input sensor type and configuration, as well as signal conditioning parameters can be selected through the Serial Peripheral Interface (SPI) Bus 44.

Mode Description

SNEF Signal Path (Mode 0)

Figure 4:
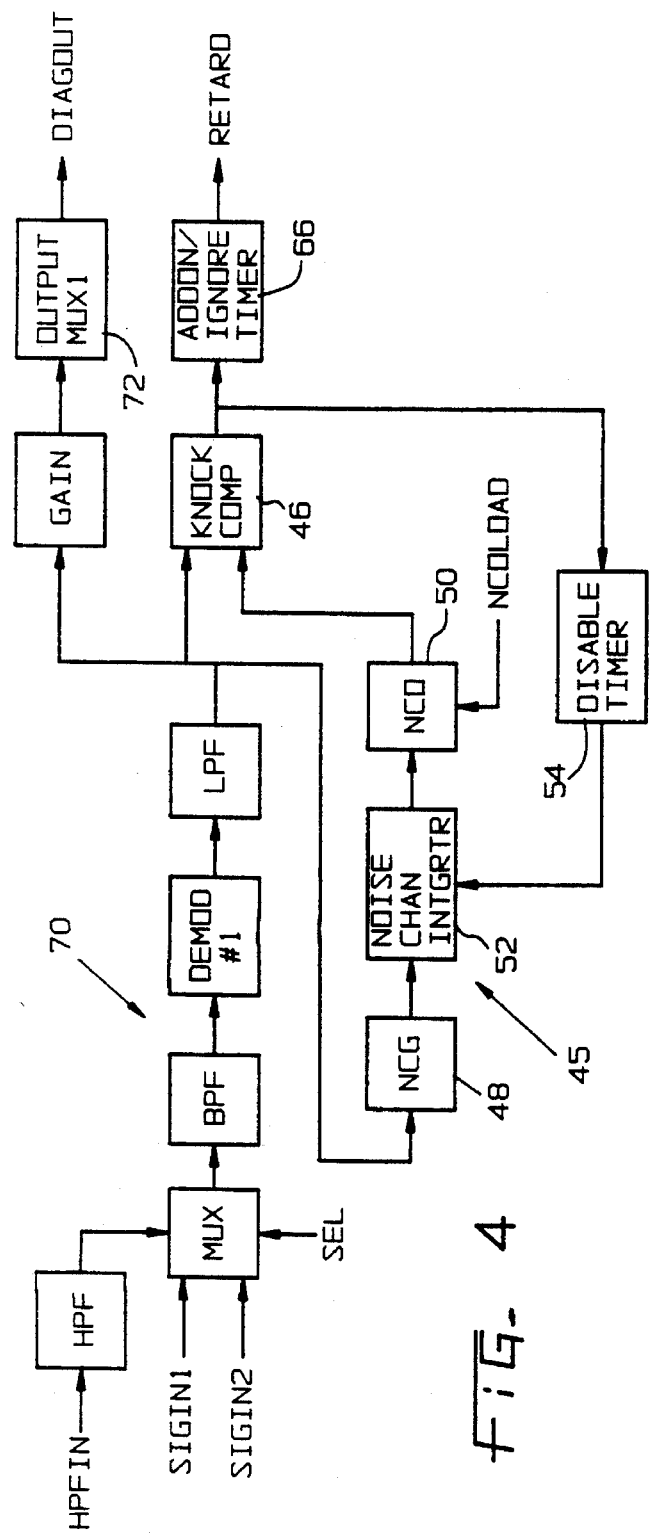
FIG. 4 is a block diagram of the SNEF signal path mode.
Figure 9:
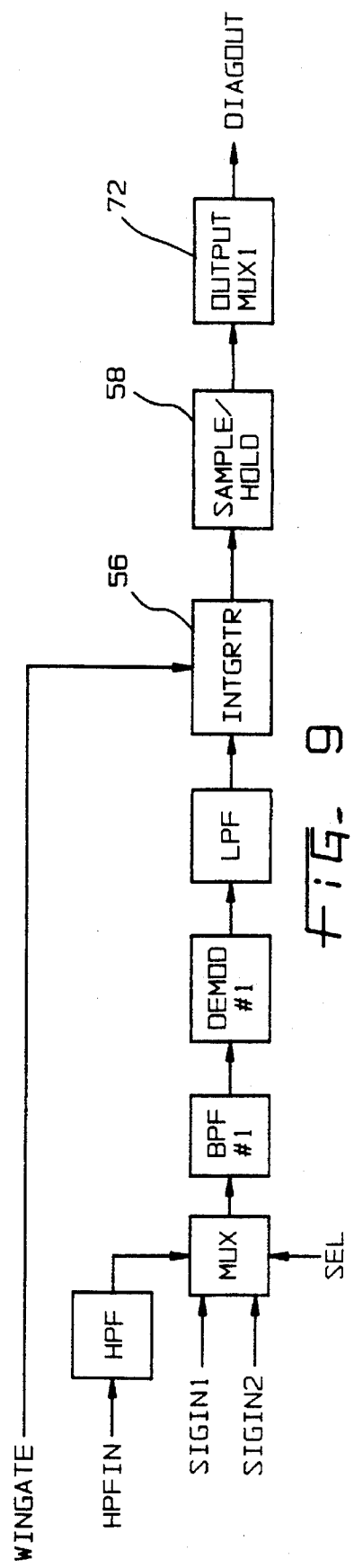
FIG. 9 is a block diagram of the integrate and read (with low pass filtering) signal path mode.

With reference to FIG. 4, the SNEF (Signal to Noise Enhancement Filter) signal path provides an active low output pulse that is proportional to the intensity and duration of the detected disturbance. The input signal can be from up to two vibration based knock sensors 28, 30 routed through the INPUT MUX or a signal pressure based signal from sensor 38 routed through the HIGH PASS FILTER input. An envelope of the input signal is generated to form a knock channel 70. This is accomplished via a switched capacitor implementation of bandpass filter BPF, a half-wave rectifier DEMOD1 and a switched capacitor implementation of a lowpass filter LPF. A noise channel 45 is created by averaging the gained knock channel and introducing a DC offset. As soon as the knock channel 70 exceeds the noise channel 45 as determined by comparator 46, the noise averaging circuit becomes disabled for a specified time or until knock channel 70 is less than noise channel 45, whichever is less. When knock channel 70 exceeds noise channel 45 for a time greater than 784 μs, the output becomes active low. The output remains low until noise channel 45 exceeds knock channel 70 for a period greater than 784 μs in duration. Additional signal processing of the output pulse length and relative crank angle position may be required to determine the occurrence of a valid knock. If multiple vibration based sensors are to be multiplexed, an external control signal must be applied to the SEL pin of the DSNEF IC 16 to operate the input multiplexer (MUX1) (FIG. 2A).

Multiple Frequency Signal Path (Mode 1)

The Multiple Frequency signal path mode of operation shown in FIG. 5 is equivalent to the SNEF signal path of FIG. 4 with the exception of the manner in which noise channel 45 is generated. In this mode, a second bandpass filter BPF2 and half-wave rectifier DEMOD2 are used to establish the input to the noise averaging circuit as described in Mode 0. This allows the noise channel to operate within a unique spectral and gain region relative to the knock channel.

Windowed SNEF Signal Path (Mode 2)

The Windowed SNEF signal path shown in FIG. 6 is identical to the SNEF signal path (Mode 0) of FIG. 4, however, both the knock and noise channels 70, 45 are established within a finite interval of time during each low-res ignition period (FIG. 6A). The window of operation is typically confined to the crank angle region in which knock is most likely to occur. An external control signal must be supplied to the WINGATE pin of the DSNEF IC for this mode to function. Signal processing through this mode only occurs during the time in which the WINGATE signal is in the high state. At the falling edge of the WINGATE signal, both the knock and noise channels 70, 45 are held at their current level until the next rising edge of the WINGATE signal. If the output transitions to the low state during the window of operation and remains low at the end of the window, it would typically be held in that state, at minimum, until the next rising edge of the WINGATE signal plus 784 μs.

It is important that the control calibration be setup with the knowledge that the output pulse length is proportional to the low resolution ignition reference period and not the knock intensity.

Dual Channel SNEF Signal Path (Mode 3)

The Dual Channel SNEF signal path of FIG. 7 provides the selection of a unique bandpass filter gain and center frequency for each of the two vibration sensor inputs SIGIN1 and SIGIN2. This mode is not configured for a pressure based sensor input via the high pass filter input. A control signal to the SEL pin of the DSNEF IC 16 must be generated to select between the outputs of the two demodulator circuits. The knock channel 70 and noise channel 45 operate in the same manner as the SNEF signal path (Mode 0) of FIG. 4. Since each of the two input channels has independent gain control, this mode is particularly useful to compensate for known variations in the output signal strength of the two sensors due to such factors as sensor location.

Integrate and Read Signal Path (Mode 6)

The Integrate and Read signal path shown in FIG. 8 provides an analog voltage output proportional to the energy content of the filtered input signal over a specified period integration. This period of integration, or integration window, is controlled by the logic high period of the control signal provided to the DSNEF IC 16 on the WINGATE pin. At the end of the integration window, the voltage level at the integrator output is transferred to hold circuit 58 and is provided as a system output on the DIAGOUT pin. The output signal level is held until the fall of the next WIN- GATE signal at which time it is updated to the current integrator output level.

Integrate and Read (with LPF) Signal Path (Mode 7)

This mode (FIG. 9) operates in the same manner as the Integrate and Read signal path (FIG. 8), however, the input signal is additionally filtered by low pass filter LPF prior to the integrator 56.

Dual Channel Integrate and Read Signal Path (Mode 5)

The Dual Channel Integrate and Read signal path of FIG. 10 allows independent control of the bandpass filter gain and frequency selection for each of the two vibration based input signals. This mode is not configured for a pressure based input via the HPF input. A control signal to the SEL pin of the DSNEF IC 16 must be generated to select between the outputs of the two demodulator circuits. The output configuration and control of the integration window are identical to the Integrate and Read signal path (Mode 6) of FIG. 8. The independent gain control feature of this mode is particularly useful to compensate for known variations in the output signal strength of the two sensors due to such factors as sensor location.

Dual Channel Integrate and Read (with LPF) Signal Path (Mode 4)

This mode, which is shown in FIG. 11, operates in the same manner as the Dual Channel Integrate and Read signal path, however, the output of the demodulator multiplexer 60 is additionally filtered by low pass filter LPF prior to the integrator 56.

Bandpass Filter Gain Range Selection

The two bandpass filters within the DSNEF IC 16 are designed to operate over a 24 dB range. The BPG stages are designed to operate with an external equivalent impedance of 1 kΩ external. External resistors combine to provide a series resistance which adds to the series resistor present at the inverting input of the BPG amplifier(s). The value of the resistive feedback path of the amplifier design is selected via bits D23–D20 in the DSNEF serial input register.

The external resistors selected are primarily dictated by the type of knock sensor used in the particular application. Resonant sensors typically require an attenuator in order to keep the worst case valid knock signals from saturating the BPG stage. Wideband or "flat response" vibration sensors typically require no external attenuator.

Pin Descriptions

AREF

This is the analog reference voltage used internally to the device. A capacitor will be placed on this pin to provide a low impedance path for switching transients.

RETARD*

This is a digital signal that indicates the presence of a knock burst on the SIGINx pin. This signal is the output of the ignore/add-on timer 66. This output is capable of driving CMOS logic loads. When any of the I&R modes are selected ("100" through "111"), this output is logic high (disabled).

DIAG1

This output is intended to be used as a test output to determine if the proper filter settings have been set via the SPI bus input. This pin can output one of seven sources depending upon what is programmed via the Serial Input Register.

DIAG2

This output is intended to be used as a test output to determine if the proper filter settings have been set via the SPI bus input. This pin can output one of seven sources depending upon what is programmed via the Serial Input Register.

DIAGOUT

This output is the scaled and level shifted (0 to 5 V) equivalent of the waveform that is output on the DIAG1 pin. This output is intended to be used as a diagnostics output to determine if the sensor is operating properly or as the signal output when any of the Integrate and Read modes is selected.

EXTREG

This output controls the regulation of the AVDD voltage. The external transistor is controlled such that it provides a regulated +8 V to the AVDD pin of the DSNEF.

HPFOUT

This is the output of an op-amp that is to be used with external components to implement a high pass filter.

HPFIN

Analog input from pressure based knock sensor 38.

SIGIN1

Analog input from vibration based knock sensor 28.

SIGIN2

Analog input from vibration based knock sensor 30.

OSC1

Input for a 4.0 MHz resonator, or input for a 4.0 MHz external clock signal.

OSC2

Input for a 4.0 MHz resonator.

SEL

Multiplexer select pin. Used to control MUX1 or MUX2.

TEST

Used to enter test modes.

DIAGIN

Used during IC level testing to inject a signal directly into the noise channel 45 gain stage.

NCOLOAD

When the proper mode is selected via the SPI bus, a rising edge on this input will cause the NCO settings previously programmed to become effective immediately.

WINGATE

When this input is low (logic "0") and the Windowed SNEF mode ("010") is selected, the LPF and noise channel integrator 52 are held at their current state until this input goes high (logic "1"). Once in the high state, the LPF and noise channel integrator 52 are "released" and allowed to follow their respective inputs.

When configured in any of the Integrate and Read modes, the I&R integrator 56 will not integrate when this input is low (logic "0"). The I&R integrator 56 will be allowed to integrate the input signal when this input is high (logic "1"). This pin will have an internal pull down to GND to insure that an open circuit on this pin will cause a logic low (no gate pulse).

RST*

After a low to high transition of this pin, the device will assume a default (power-up) state by setting certain parameters into a known state.

SMCAP1, SMCAP2, SMCAP3, SMCAP4

These pins are provided for external filter components.

DI

This input pin receives up to a 48-bit serial word that controls the calibration state of the device. Only the data received during the last SCLK pulses before the rising of CS* shall be considered valid. New data will be latched on the rising edge of CS*. The data is loaded most significant bit first; therefore, the last bit to be loaded will be DO.

SCLK

This is a 0 to 5.4 MHz compatible clock input pin that will synchronously shift in data on the DI pin when CS* is low. CS* must be taken high and then low again to allow SCLK to accept new data on DI.

CS*

This is a chip select input pin. On the rising edge of CS*, the new data read in on the DI pin will be latched. The CS* input has an internal pull-up to DVDD to guarantee that an "open" input pin will assume the logic high (deselected) state.

As indicated previously, the coded data signal for reconfiguration of the circuit elements is received by serial data register 44 (FIG. 2B). The following table illustrates the bit positions in the 8 by 6 serial input register:

| SERIAL INPUT REGISTER (SPI BUS) DESCRIPTION | | | | | | | |
|---|---|---|---|---|---|---|---|
| MSB-D47 | | | | | | | LSB-D40 |
| MODE2 | MODE1 | MODE0 | VLSG3 | VLSG2 | VLSG1 | VLSG0 | HPFBYP |
| MSB-D39 | | | | | | | LSB-D32 |
| DIAG2-2 | DIAG2-1 | DIAG2-0 | DIAG1-2 | DIAG1-1 | DIAG1-0 | MUXOR | NCOLOAD |
| MSB-D31 | | | | | | | LSB-D24 |
| DTIME1 | DTIME0 | NCITC1 | NCITC0 | NCDTC1 | NCDTC0 | Q1 | Q0 |
| MSB-D23 | | | | | | | LSB-D16 |
| AV3 | AV2 | AV1 | AV0 | FC3 | FC2 | FC1 | FC0 |
| MSB-D15 | | | | | | | LSB-D8 |
| LPCF2 | LPCF1 | LPCF0 | NCG3 | NCG2 | NCG1 | NCG0 | FILTSEL |
| MSB-D7 | | | | | | | LSB-D0 |
| NCO4 | NCO3 | NCO2 | NCO1 | NCO0 | OFFCNCL | BYTE1 | BYTE0 |

Order of Communication to Registers

The two least significant bits of Serial Input Register determine how many bytes of the register to latch in. On the rising edge of CS*, the last two bits shifted into the Serial Input Register (BYTE1, BYTE0) are decoded and enable the specified bytes of the Serial Input Register to be loaded.

For example, if the BYTEx field is "11", all bytes of the Serial Input Register will be loaded. A "00" in the BYTEx field will only load the first byte of the Serial Input Register. Thus an 8 bit SPI transfer can be used to update the NCO bits and the OFFCNCL bit without affecting other bits in the Serial Input Register.

There are some instances where 2 consecutive writes of 3 (or more) bytes are necessary for the complete configuration of the device (i.e., the two separate BPFs). In these cases, CS* must be transitioned to the high state between the two writes in order for the data to be properly loaded into the Serial Input Register.

It should be noted that regardless of the number of bits in a single SPI transfer, CS* must remain low for the entire transfer (up to 48 bits). When the system is used with 8 bit processors, the SPI transfers will consist of bursts, 8 bits in length, separated by some delay time.

The following table indicates the function of the various data bits loaded into the serial data register:

| BIT(s) | FUNCTION | RANGE |
| --- | --- | --- |
| DIAG2-1,1,0 | Select output for diagnostics MUX 2 | 000: Output of BPF1 Gain<br>001: Output of DEMOD #1<br>010: Output of NCG<br>011: Output of NCO<br>100: Output of I&R Integrator<br>101: Output of BPF2<br>110: Output of Offset Cancel |
| DIAG1-2,1,0 | Select output for diagnostics MUX 1 | 000: Output of PBF2 Gain<br>001: Output of BPF1<br>010: Output of LPF<br>011: Output of VLS Gain<br>100: Output of Sample/Hold<br>101: Output of DEMOD #2<br>110: Output of NC Integrator |
| FILTSEL | Select which BPF is being programmed | 0: Program BPF1 FC, AV, and Q<br>1: Program BPF2 FC, AV, and Q |
| MODE2-0 | Mode Select | 111:I&R (with LPF) signal path selected.<br>110:Integrate and Read signal-path selected.<br>101:Dual Channel Integate and signal path selected.<br>100:Dual Channel Integate and Read (with LPF) signal path selected.<br>011:Dual Channel SNEF signal path selected.<br>010:Windowed DSNEF signal path selected.<br>001:Multiple Frequency signal path selected.<br>000:DSNEF signal path selected |
| VLSG3-0 | VLS Amplifier Gain | 1.3V/V to 12.3 V/V<br>000: 1.3 V/V<br>. . .<br>0100: 12.3 V/V<br>1100–1111: Not used |
| MUXOR | Wire OR SIGIN1 & SIGIN2 | 0: Normal Mode<br>1: SIGIN1 + SIGIN2 |
| HPFBYP | HPF Bypass | 0: Bypass HPF Channel<br>1: Select HPF Channel |
| OFFCNCL | Offset Channel | 0: Offset Cancel Disabled<br>1: Offset Cancel Enabled |
| FC3-0 | BPF Fc | 0000: 5.05 KHz    1000: 9.26 KHz<br>0001: 5.56 KHz    1001: 10.10 KHz<br>0010: 6.17 KHz    1010: 11.11 KHz<br>0011: 6.54 KHz    1011: 12.35 KHz<br>0100: 6.95 KHz    1100: 13.89 KHz<br>0101: 7.41 KHz    1101: 15.87 KHz<br>0110: 7.94 KHz    1110: 18.52 KHz<br>0111: 8.55 KHz    1111: 22.22 KHz |
| AV3-0 | BPF Av | 0000: 0 dB<br>. . .<br>1100: +24 dB<br>1101: +26.8 dB<br>1110–1111: Not used |
| Q1-0 | BPF Q | 00: 1.5<br>. . .<br>11: 10.5 |
| LPCF2-0 | LPF fc | 000: 121 Hz<br>001: 197 Hz<br>010: 250 Hz<br>011: 312 Hz<br>100: 417 Hz<br>101: 536 Hz<br>110: 750 Hz<br>111: 938 Hz |
| NCG3-0 | Noise Chan. Gain | 0000: 1.3<br>. . .<br>1111: 2.8 |
| NCO4-0 | Noise Chan. Offset (Modes 0–3)<br><br>or<br>I&R Integration Time Constant (Modes 4–7) | 0000: 0 mV<br>. . .<br>11111: 248 mV<br>00000: 25 μs<br>. . .<br>11111: 800 μs |
| NCIT1-0 | Increasing Time Const. | 00: 62 ms<br>. . .<br>11: 137 ms |

| BIT(s) | FUNCTION | RANGE |
| --- | --- | --- |
| NCDTC1-0 | Decreasing Time Const. | 00: 210 ms<br>...<br>11: 330 ms |
| DTIME1-0 | Disable Time | 00: 2.5 ms<br>01: 7.5 ms<br>10: 15 ms<br>11: 30 ms |
| NCOLOAD | NCO update mode select | 0: Update NCO immediately<br>1: Update NCO after NCOLOAD |
| BYTE1-0 | Byte Select | 00: Update D7 - D0<br>01: Update D15 - D0<br>10: Update D23 - D0<br>11: Update ALL bytes |

As described above, the various functional circuit blocks of the system can be interconnected in a plurality of circuit topologies to process the pressure and vibration knock signals in accordance with a selected processing mode in order to better match the processing mode to the particular engine characteristics. This enables a single, general purpose knock sensor to be utilized for a wide variety of engines by appropriately reconfiguring the circuit topology of the sensor in accordance with the inputted digital data.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In combination with an internal combustion engine in which knock induced vibrations occur, a reconfigurable knock detection system comprising:
   a sensor means on said engine for detecting knock and generating an electrical knock signal corresponding to the detected knock;
   a knock detection circuit having an input connected to receive said electrical knock signal and an output connected to an engine controller, said knock detection circuit including means for processing the knock signal and generating an appropriate output signal on said output if the knock signal is identified as valid;
   said circuit including a plurality of circuit devices capable of being interconnected in a plurality of different circuit topology configurations to thereby process said knock signal using a desired knock processing mode selected from among a plurality of different knock processing modes corresponding to said different circuit topology configurations;
   said circuit further including interconnect means for selecting said desired knock processing mode in response to a coded data signal input to said circuit.

2. The combination of claim 1 wherein said coded data signal is a multiple bit digital signal, and said interconnect means includes: a data register for receiving said multiple bit digital signal, and switch means set by the multiple bit digital signal received by said data register for selecting said desired knock processing mode.

3. The combination of claim 1 including a plurality of said sensors, and wherein said detection circuit includes means for inputting signals from selected ones of said sensors in response to said coded data signal.

4. The combination of claim 3 wherein one of said sensors is a vibration sensor and another of said sensors is a pressure sensor.

5. The combination of claim 1 wherein in at least of one said circuit topology configurations, said circuit devices are configured in a manner to process said knock signal by means of a signal to noise enhancement filtering technique.

6. The combination of claim 5 wherein in at least one other of said circuit topology configurations, said circuit devices are configured in a manner to process said knock signal by means of an integrate and read technique.

7. A reconfigurable knock detection system for an internal combustion engine in which knock induced vibrations occur, and wherein the engine includes a sensor mounted thereon for generating an electrical knock signal corresponding to said knock induced vibrations, said knock detection system comprising:
   a knock detection circuit having an input adapted to receive said electrical knock signal and an output adapted to be connected to an engine controller, said knock detection circuit including means for processing the knock signal and generating an appropriate output signal on said output if the knock signal is identified as valid;
   said circuit including a plurality of circuit devices capable of being interconnected in a plurality of different circuit topology configurations to thereby process said knock signal in a desired knock processing mode selected from a plurality of different knock processing modes corresponding to said different circuit topology configurations;
   said circuit further including interconnect means for selecting said desired knock processing mode in response to a coded data signal input to said circuit.

8. The system of claim 7 wherein said coded data signal is a multiple bit digital signal and said interconnect means includes: a data register for receiving said multiple bit digital signal, and switch means set by the multiple bit digital signal received by said data register for selecting said desired knock processing mode.

9. The system of claim 7 wherein in at least of one said circuit tomology configurations, said circuit devices are configured in a manner to process said knock signal by means of a signal to noise enhancement filtering technique.

10. The system of claim 9 wherein in at least one other of said circuit topology configurations, said circuit devices are configured in a manner to process said knock signal by means of an integrate and read technique.

11. A reconfigurable knock detection system for an internal combustion engine in which knock induced vibrations occur, wherein the engine includes a sensor mounted thereon for generating an electrical knock signal corresponding to said knock induced vibrations, said knock detection system comprising:

- a knock detection circuit having an input adapted to receive said electrical knock signal and an output adapted to be connected to an engine controller, said knock detection circuit including means for processing the knock signal and generating an appropriate output signal on said output if the knock signal is identified as valid;
- said circuit comprising a plurality of functional circuit blocks each adapted for performing one or more discrete operations on said knock signal,
- said circuit further including interconnect means for selecting and interconnecting certain ones of said circuit blocks in one of a plurality of different configurations in response to a coded input signal to thereby process said knock signal in a desired knock processing mode selected from a plurality of available knock processing modes.

12. The system of claim 11 wherein said interconnect means includes a plurality of internal electronic switches that interconnect said circuit blocks in response to said coded data signal.

13. The system of claim 12 wherein said coded data signal is a multiple bit digital signal.

* * * * *